(12) United States Patent
Hirai (10) Patent No.: US 7,798,507 B2
(45) Date of Patent: Sep. 21, 2010

(54) VEHICLE SUSPENSION APPARATUS (75) Inventor: Hideki Hirai, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 184 days.

(21) Appl. No.: 12/220,316

(22) Filed: Jul. 23, 2008

(65) Prior Publication Data
US 2009/0026724 A1 Jan. 29, 2009

(30) Foreign Application Priority Data

Jul. 24, 2007 (JP) ............... 2007-191895

(51) Int. Cl.
B60G 3/20 (2006.01)
(52) U.S. Cl. ............ 280/124.135; 280/124.143; 280/124.144; 280/124.15
(58) Field of Classification Search ...............
280/124.134–124.138, 124.142–124.144, 280/124.148–124.151
See application file for complete search history.

(56) References Cited

U.S. PATENT DOCUMENTS 5,697,633 A * 12/1997 Lee .................... 280/124.136
7,258,355 B2   8/2007 Amano
2005/0275183 A1 * 12/2005 Amano ............... 280/124.128

FOREIGN PATENT DOCUMENTS

| JP | 7-257124 A | 10/1995 |
|---|---|---|
| JP | 2000-25435 (A) | 1/2000 |
| JP | 2000-264029 A | 9/2000 |
| JP | 2005-225382 A | 8/2005 |

* cited by examiner

Primary Examiner—Ruth Ilan
(74) Attorney, Agent, or Firm—Carrier, Blackman & Associates, P.C.; William D. Blackman; Joseph P. Carrier (57) ABSTRACT A vehicle suspension apparatus 10 includes a plurality of arms 14, 27 to 29 respectively extending from the side of a vehicle body, and a knuckle 13 swingably supported on the leading ends of these arms 14, 27 to 29 for swingably mounting a wheel 12 thereon. The arm 27 includes a straight arm portion 31, a first rubber bush 32 provided on one end of the arm portion 31 and a second rubber bush 34 provided on the other end of the arm portion 31. And, the center lines C1 and C2 of the first and second rubber bushes 32 and 34, when they are viewed from the axial direction of the arm portion 31, are set to have a predetermined angle of inclination between them.

5 Claims, 7 Drawing Sheets

PRIOR ART

VEHICLE SUSPENSION APPARATUS

The present invention claims priority from Japanese Patent Application No. 2007-191895 filed on Jul. 24, 2007, the entire content of which is incorporated herein by reference.

BACKGROUND OF INVENTION

1. Field of the Invention

The present invention relates to a vehicle suspension apparatus which dampens movement of a wheel up and down to relieve an input from a road surface, in order to secure the stability of a vehicle.

2. Description of the Related Art

As a suspension apparatus for a vehicle, there is known a suspension apparatus of a double wishbone type or of a multi-link type.

This type of vehicle suspension apparatus is generally employed in such a manner that the design thereof is changed according to uses.

As a vehicle suspension apparatus of this type, there is known a suspension apparatus of a multi-link type which is used to support the rear wheels of a vehicle (for example, JP-A-2005-225382, Page 15, FIG. 2)

Now, description will be given below of the outline of a technology disclosed in JP-A-2005-225382 with reference to FIG. 7.

Figure 7:
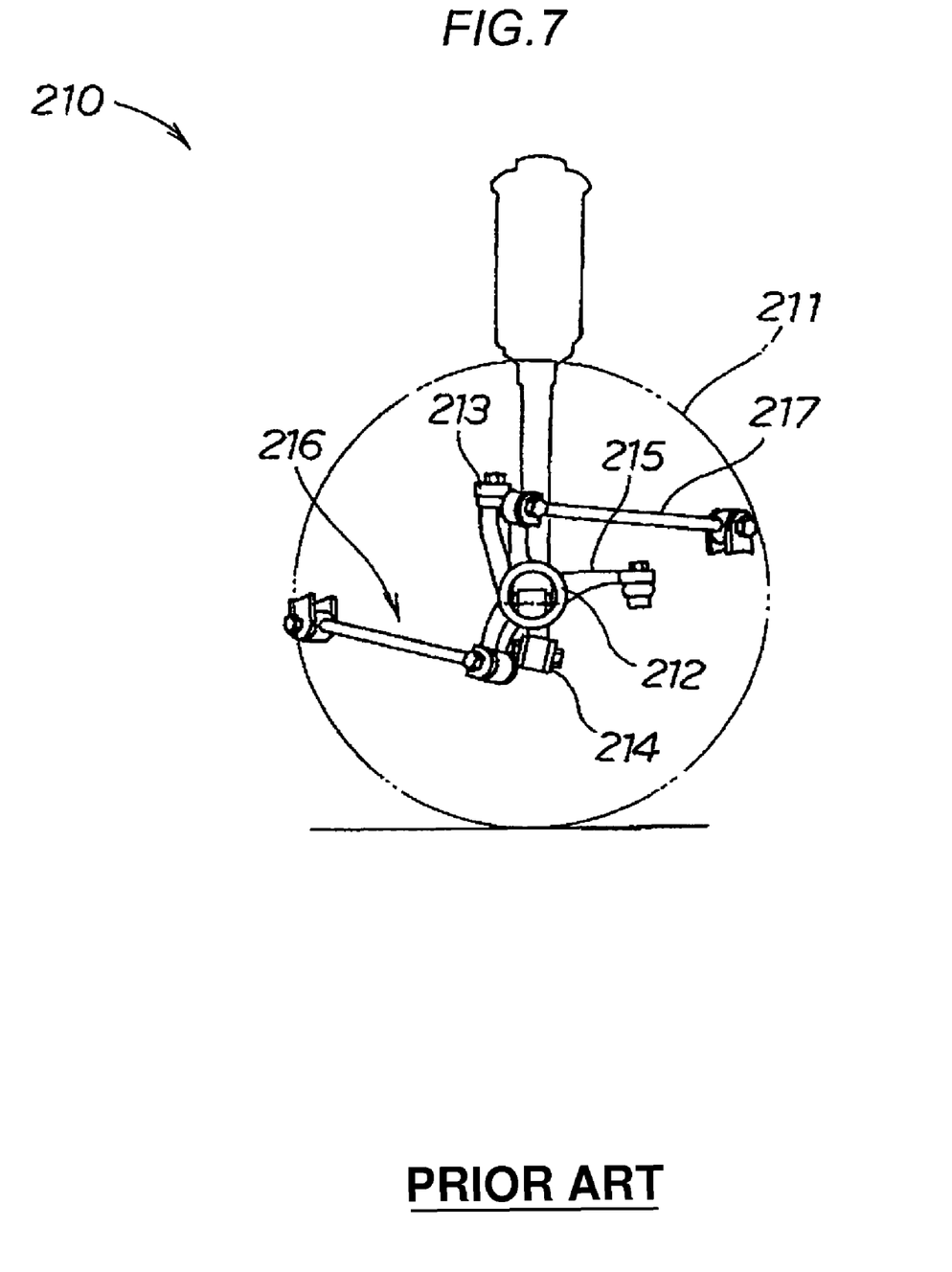
FIG. 7 is an explanatory view of the basic structure of a conventional vehicle suspension apparatus.

FIG. 7 is an explanatory view of the basic structure of a conventional suspension apparatus for a vehicle.

Specifically, this vehicle suspension apparatus 210 includes:

a knuckle 212 for mounting a rear wheel 211 thereon, an upper arm (a first lateral arm) 213 extending outwardly in the width direction of a vehicle body from a vehicle body frame (not shown) for supporting the upper part of the knuckle 212, a lower arm (a second lateral arm) 214 extending outwardly in the vehicle width direction from the vehicle body frame for supporting the lower part of the knuckle 212, a control arm (a third lateral arm) 215 extending outwardly in the vehicle width direction from the vehicle body frame at a height between these upper and lower arms 213 and 214 for supporting the knuckle 212, a leading arm 216 extending forwardly of the vehicle body from the vehicle body frame for supporting the knuckle 212, and a trailing arm 217 extending backwardly of the vehicle body from the vehicle body frame for supporting the knuckle 212.

The trailing arm 217 is swingably supported on the vehicle body side through a rubber bush (not shown) and is also swingably supported on the knuckle 212 side through a rubber bush (not shown). The remaining arms 213 to 216 also include rubber bushes on the vehicle side and on the knuckle side.

However, in the vehicle suspension apparatus 210, the number of rubber bushes for swingably supporting the arms 213 to 217 is large. This increases the portions of the rubber bushes that are flexed greatly when the suspension is stroked. Also, this increases the portions of the rubber bushes that must secure the large hysteresis of the rubber bushes, which makes it necessary to increase the outside diameters of the rubber bushes. The increase of the portion may result in the increased weights of the rubber bushes and thus weight of the vehicle suspension apparatus.

Also, the vehicle suspension apparatus 210 occurs an expected vibration absorbing mechanism which may raise a cause to worsen the driving feeling of the vehicle due to the deflection amount of the rubber bush is large.

SUMMARY OF INVENTION

In one or more embodiments of the invention, a vehicle suspension apparatus minimizes the deflection amount of a rubber bush to reduce the weight of an arm and improves the driving feeling of a vehicle.

According to a first aspect of the present invention, a vehicle suspension apparatus is provided with a plurality of arms respectively extending from a vehicle body, and a knuckle swingably supported on ends of the arms and to which a wheel is attached, wherein one of the arms comprises: a straight arm portion; a first rubber bush disposed on one end of the arm portion; and a second rubber bush disposed on the other end of the arm portion; and wherein the first rubber bush and the second rubber bush are disposed on the arm portion to have an inclination angle between a center line of the first rubber bush and a center line of the second rubber bush, viewed from an axial direction of the arm portion.

According to a second aspect of the present invention, the inclination angle is within a range of 5 to 20 degrees.

According to a third aspect of the present invention, the one of the arms is coupled to a front side of the knuckle.

According to a fourth aspect of the present invention, the plurality of arms comprise: an upper arm extending from the vehicle body in a vehicle width direction and coupled to an upper part of the knuckle, and three lower arms respectively extending from the vehicle body in the vehicle width direction and coupled to an lower part of the knuckle.

According to a fifth aspect of the present invention, the lower arms comprise: a first lower arm extending from the vehicle body in the vehicle width direction and coupled to a portion on a front edge of the knuckle corresponding to a height position of a wheel axle, wherein the first lower arm is the one of the plurality of the arms; a second lower arm extending from the vehicle body in the vehicle width direction and coupled to a portion on a vicinity of a center of the knuckle corresponding to a lower position of the wheel axle; and a third lower arm extending from the vehicle body in the vehicle width direction and coupled to a portion on a rear edge of the knuckle corresponding to the lower position of the wheel axle.

According to the first aspect of the present invention, a plurality of arms are respectively extended from a vehicle body and a knuckle is swingably supported. Each arm includes a straight arm portion, a first rubber bush disposed on one end of the arm portion, and a second rubber bush disposed on the other end of the arm portion. When viewed from the axial direction of the arm portion, the center lines of the first and second rubber bushes have a given inclination angle between them.

Owing to this structure, the center lines of the first and second rubber bushes may be set in the optimum direction and thus the deformation amounts (hysteresis) of the first and second rubber bushes may be reduced. As a result of this, the outside diameters of the first and second rubber bushes may be reduced, thereby being able to reduce the weight of the vehicle suspension apparatus.

Generally, in a suspension apparatus such as a multi-link type of suspension apparatus including a large number of arms, when bushes flex greatly, there occurs an unexpected vibration absorbing mechanism, which may worsen the driving feeling of the vehicle. In view of this, the center lines of the first and second rubber bushes are set so as to have a given inclination angle between them, the center lines of the first and second rubber bushes are set in the optimum direction, and the deformation amounts (hysteresis) of the first and second rubber bushes are reduced, thereby being able to improve the driving feeling of the vehicle.

According to the second aspect of the present invention, since the inclination angle between the center lines of the first and second rubber bushes is set in the range of 5 to 20 degrees, the vehicle driving feeling may be improved further. Here, when the inclination angle is less than 5 degrees, the deformation amounts (hysteresis) of the first and second rubber bushes may not be reduced satisfactorily. When the inclination angle is larger than 20 degrees, the deformation amounts of the first and second rubber bushes increase and thus the hysteresis thereof increases, which is not favorable from the viewpoint of the driving feeling.

According to the third aspect of the present invention, an arm, which is disposed on the front side of the knuckle, has a function to mainly restrict the movement of the knuckle in the toe direction. To provide a preferable toe angle variation characteristic, it is necessary to reduce the length of the arm. In this case, in the arm that is disposed on the front side of the knuckle, the rubber bush is easy to distort or deform greatly because the arm length is small. The arm, in which the first and second rubber bushes have a given inclination angle between their respective center lines, is connected to the front side of the knuckle. This may restrict the deformation of the bushes effectively.

Other aspects and advantages of the invention will be apparent from the following description and the appended claims.

DESCRIPTION OF EXEMPLARY EMBODIMENTS

Description will be given below of the best mode for carrying out the invention with reference to the accompanying drawings. Here, the drawings are viewed according to the direction of reference numerals.

As shown in FIGS. 1 to 4, a vehicle suspension apparatus 10 is a rear suspension apparatus which is used for a rear wheel 12. This vehicle suspension apparatus 10 includes:

a knuckle 13 for mounting thereon the rear wheel 12 rotatably;

an upper arm 14 extending outwardly in the vehicle width direction from the vehicle body side for supporting the upper part of the knuckle 13;

a group of lower arms 15 respectively extending outwardly in the vehicle width direction from the vehicle body side for supporting the lower part of the knuckle 13;

a damper unit (shock absorber) 16 provided on and between a vehicle body and the upper part of the knuckle 13 for damping impacts input from the wheel 12; and a stabilizer 17 provided on and between the vehicle body and the upper part of the knuckle 13 for stabilizing the vehicle body.

The wheel 12 includes a wheel (not shown) to be mounted on the knuckle 13 and a tire 19 to be mounted on the wheel.

The upper arm 14 is an arm which has a substantially A-like shape. Specifically, the upper arm 14 includes:

front and rear vehicle body side rubber bush joints 21 and 21 which are respectively formed on the lower ends of the substantially A-like shape and are to be swingably connected to the vehicle body;

a knuckle side rubber bush joint 22 formed on the upper end of the substantially A-like shape for supporting the upper part of the knuckle 13 swingably; and an opening 23 which is formed in the hollow portion of the substantially A-like shape and through which the damper unit 16 may be inserted.

The front and rear vehicle body side rubber bush joints 21 and 21 may be mounted onto the vehicle body using bolts 24 and 24 respectively.

The lower arm group 15 includes:

a first lower arm (lateral rod) 27 extending outwardly in the vehicle width direction from the vehicle body and is used to support the height position of a wheel center (the center of the wheel 12) 26 on the front end of the knuckle 13;

a second lower arm (lateral rod) 28 extending outwardly in the vehicle width direction from the vehicle body for supporting the lower position of the axle 26 in the vicinity of the knuckle 13; and a third lower arm (lateral rod) 29 extending outwardly in the vehicle width direction from the vehicle body for supporting the lower position of the wheel center 26 on the rear end of the knuckle 13.

The first to third lower arms 27 to 29 are each made of a substantially straight arm which is connected by welding. They are disposed in the following order from the front side (front portion) of the vehicle body: that is, the first lower arm 27, second lower arm 28 and third lower arm 29. Also, the first to third lower arms 27 to 29 are respectively arranged to extend in the right and left direction (in the vehicle width direction).

The first lower arm (arm) 27 includes: a straight arm portion (rod) 31; a vehicle body side annular-shaped portion 33 which is welded to one end of the arm portion 31 and is supported on the vehicle body side through a first rubber bush (rubber bush joint) 32; and, a knuckle side annular-shaped portion 35 which is welded to the other end of the arm portion 31 and may be mounted onto the knuckle 13 side through a second rubber bush (rubber bush joint) 34.

That is, the first lower arm 27 includes a weld structure portion 36 on one end of the arm portion 31 and also a weld structure portion 37 on the other end of the arm portion 31. Further, the first lateral rod (arm) 27 is connected to the front side of the knuckle 13.

The first rubber bush 32 may be mounted onto the vehicle body using a bolt 38, while the second rubber bush 34 may be mounted onto the knuckle 13 using a bolt 39.

The first and second rubber bushes 32 and 34 are structured such that the center lines of the first and second rubber bushes 32 and 34, when they are viewed from the axial direction of the arm portion 31, have a given inclination angle between them. Preferably, the inclination angle between these center lines may be set in the range of 5 to 20 degrees.

The second lower arm 28 includes a rod 41, a vehicle body side annular-shaped portion 43 welded to one end of the rod 41 and supported on the vehicle body side through a rubber bush joint 42, and a knuckle side joint portion 45 to be mounted onto the knuckle 13 side through a rubber bush joint 44.

That is, the second lower arm 28 includes a weld structure portion 46 on one end of the rod 41 and also a weld structure portion 47 on the other end of the rod 41.

The rubber bush joint 42 may be mounted onto the vehicle body using a bolt 48, while the knuckle side joint portion 45 may be mounted onto the knuckle 13 using a bolt 49.

The third lower arm 29 includes a rod 51, a vehicle body side annular-shaped portion 53 welded to one end of the rod 51 and supported on the vehicle body side through a rubber bush joint 52, and a knuckle side joint portion 55 welded to the other end of the rod 51 and supported on the knuckle 13 side through a rubber bush joint 54.

That is, the third lower arm 29 includes a weld structure portion 56 on one end of the rod 51 and also a weld structure portion 57 on the other end of the rod 51.

The rubber bush joint 52 may be mounted onto the vehicle body using a bolt 58, while the knuckle side joint portion 55 may be mounted onto the knuckle 13 using a bolt 59.

Figure 1:
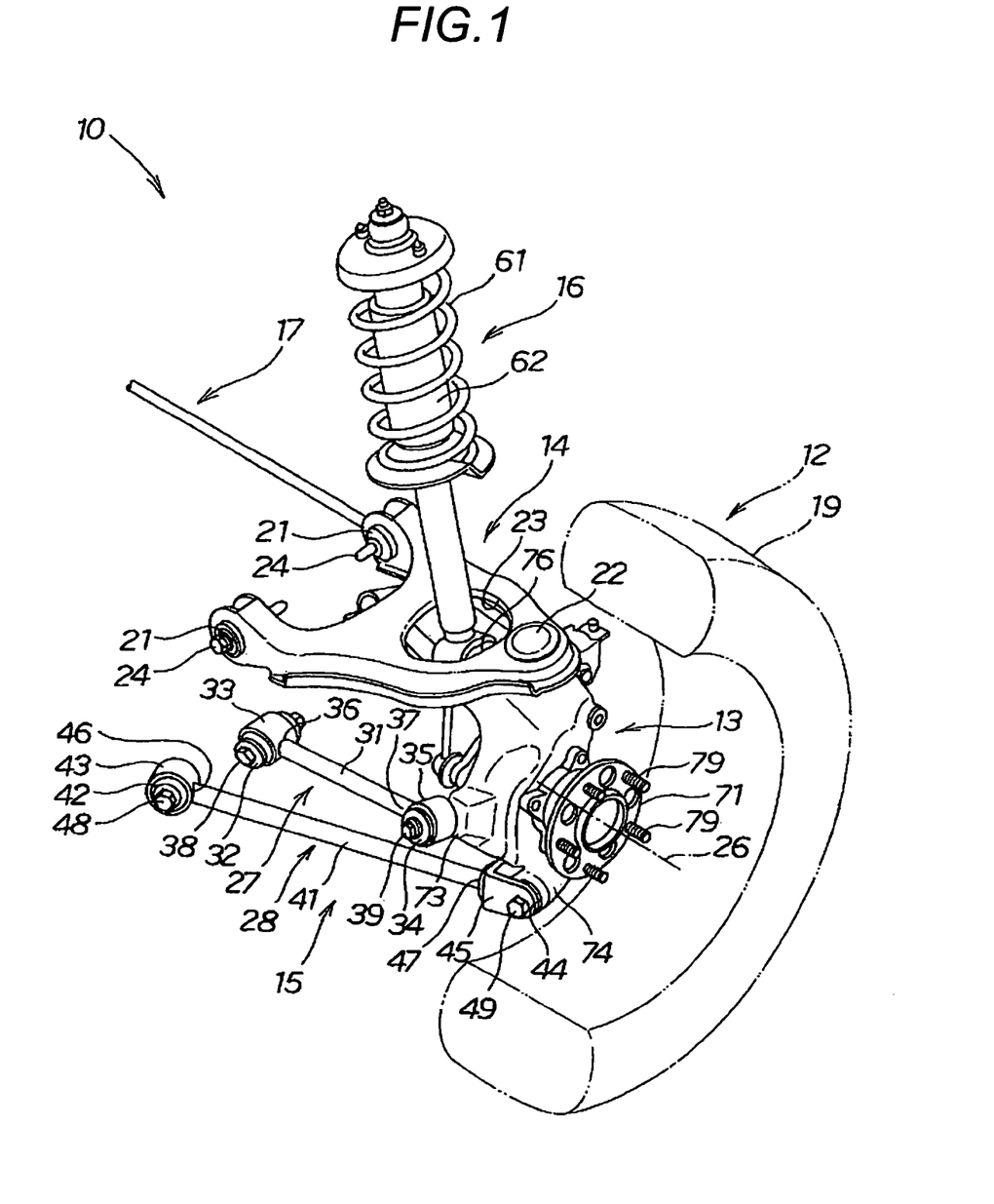
FIG. 1 is a perspective view of a vehicle suspension apparatus according to the invention.
Figure 2:
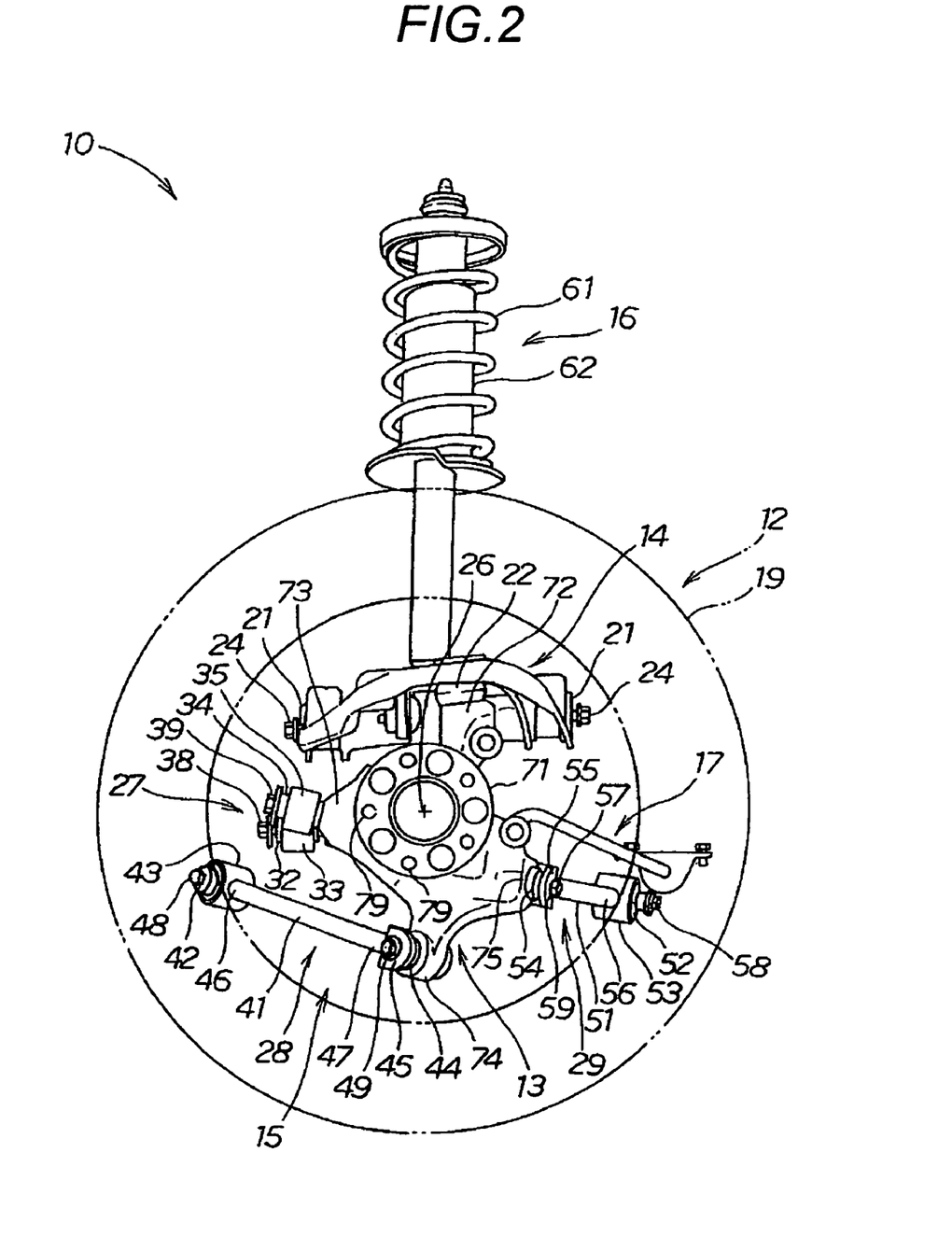
FIG. 2 is a side view of the vehicle suspension apparatus shown in FIG. 1.
Figure 3:
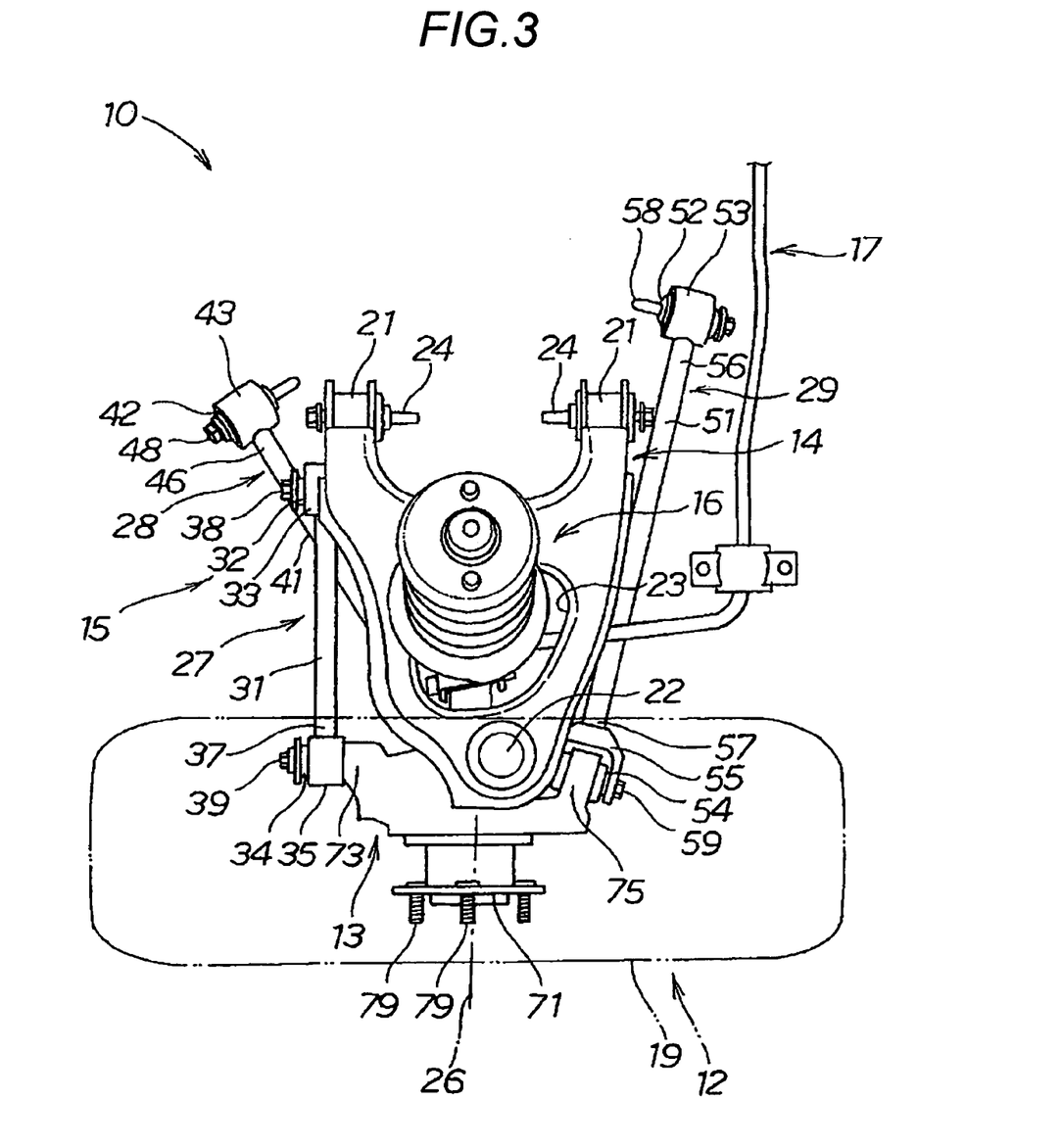
FIG. 3 is a plan view of the vehicle suspension apparatus shown in FIG. 1.
Figure 4:
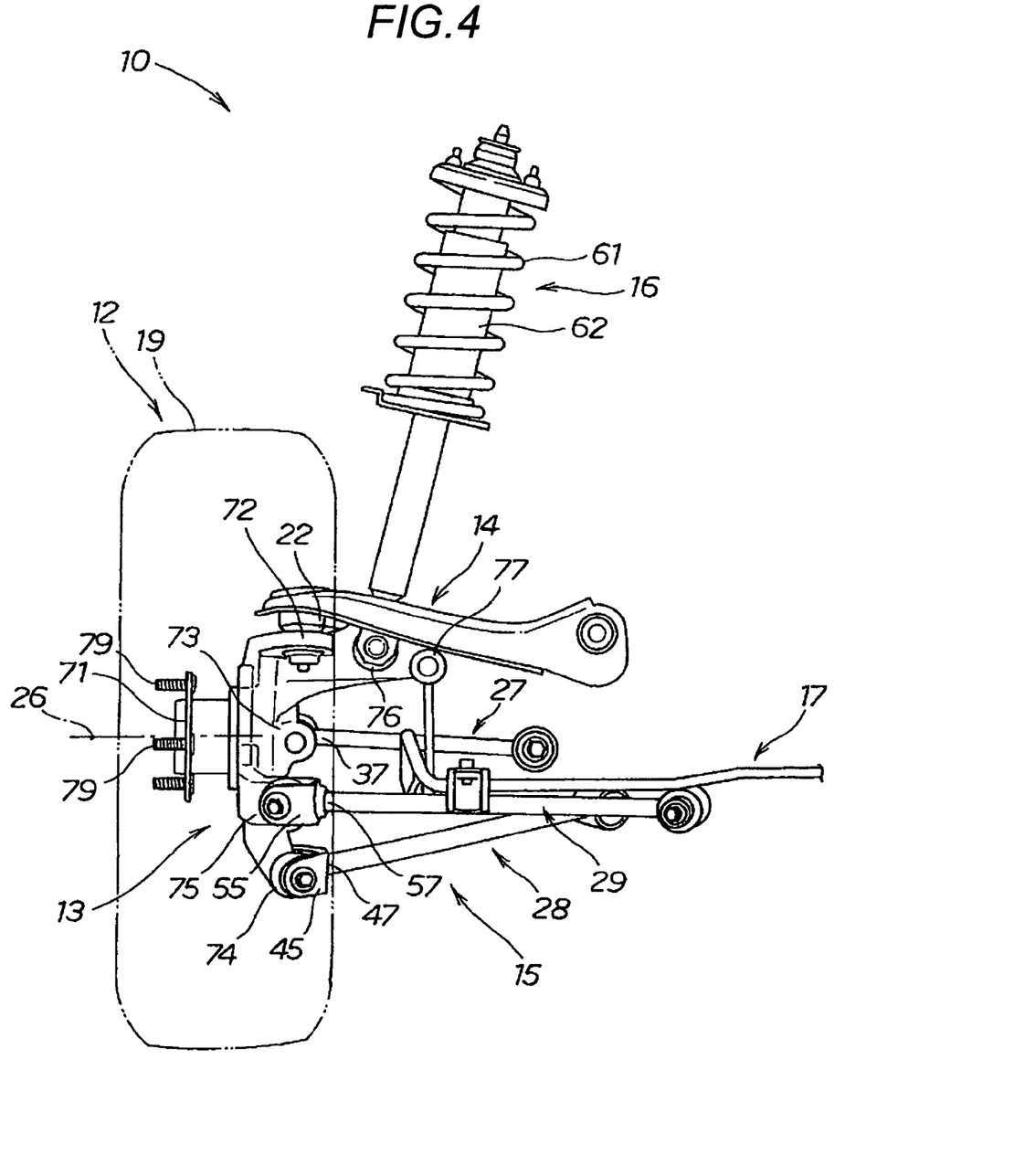
FIG. 4 is a back view of the vehicle suspension apparatus shown in FIG. 1.

As shown in FIG. 4, the weld structure portions 37, 47 and 57 of the first to third lower arms 27 to 29, which are respectively disposed on the knuckle 13 side, are respectively stored within the tire 19.

The damper unit 16 includes a coil spring (spring) 61 for absorbing an input from the tire 19 (damping the impacts of the vehicle body), and a damper 62 provided on and between the vehicle body and knuckle 13 for damping the movement of the coil spring 61.

The coil spring 61 is disposed outside the damper 62 and coaxially therewith.

The knuckle 13 includes a wheel mounting portion 71 for mounting a wheel (not shown), an upper arm support portion 72 formed upwardly of the wheel center 26 and supported by the upper arm 14, a first lower arm support portion 73 formed forwardly of (in front of) the wheel center 26 and supported by the first lower arm 27, a second lower arm support portion 74 formed downwardly of the wheel center 26 and supported by the second lower arm 28, a third lower arm support portion 75 formed rearward downwardly of the wheel center 26 and supported by the third lower arm 29, a damper unit connecting portion 76 which is formed upwardly of the wheel center 26 and to which the damper unit 16 may be connected, and a stabilizer connecting portion 77 which is formed rearward upwardly of the wheel center 26 and to which the stabilizer 17 may be connected.

The wheel mounting portion 71 includes a plurality of bolts 79 which are used to fasten the wheel in cooperation with nuts.

As shown in FIG. 4, from the outside of the vehicle body with respect to the vehicle width direction, there are arranged the upper arm support portion 72, damper unit connecting portion 76 and stabilizer connecting portion 77 sequentially in this order. That is, to the knuckle 13, from the outside of the vehicle body with respect to the vehicle width direction, there are connected the upper arm 14, damper unit 16 and stabilizer 17 sequentially in this order.

Further, as shown in FIG. 4, the upper arm support portion 72, damper unit connecting portion 76 and stabilizer connecting portion 77 are respectively disposed in the vicinity of the wheel center 26. That is, the upper arm 14, damper unit 16 and stabilizer 17 are respectively connected to the knuckle 13 not only substantially at the same height with respect to the vehicle body height direction when they are viewed from the side surfaces thereof but also in the vicinity of the wheel center 26 of the wheel 12 (around the wheel center).

The stabilizer 17 is a member which is provided on and between the right and left rear wheels 12 (the left rear wheel is not shown). For example, when the right and left rear wheels 12 move in phase in the vertical direction, the stabilizer 17 is not allowed to function as a spring. However, when the right and left rear wheels 12 move in reversed phase respectively (for example, when the vehicle body rolls at a curve and the like), the bar of the stabilizer 17, which is disposed in the neighborhood of the center thereof, is twisted. This twist rigidity provides resistance which holds down the upwardly jumping movement of the wheel, with the result that the inclination of the vehicle body is controlled to thereby be able to enhance the stability of the vehicle body.

Figure 5:
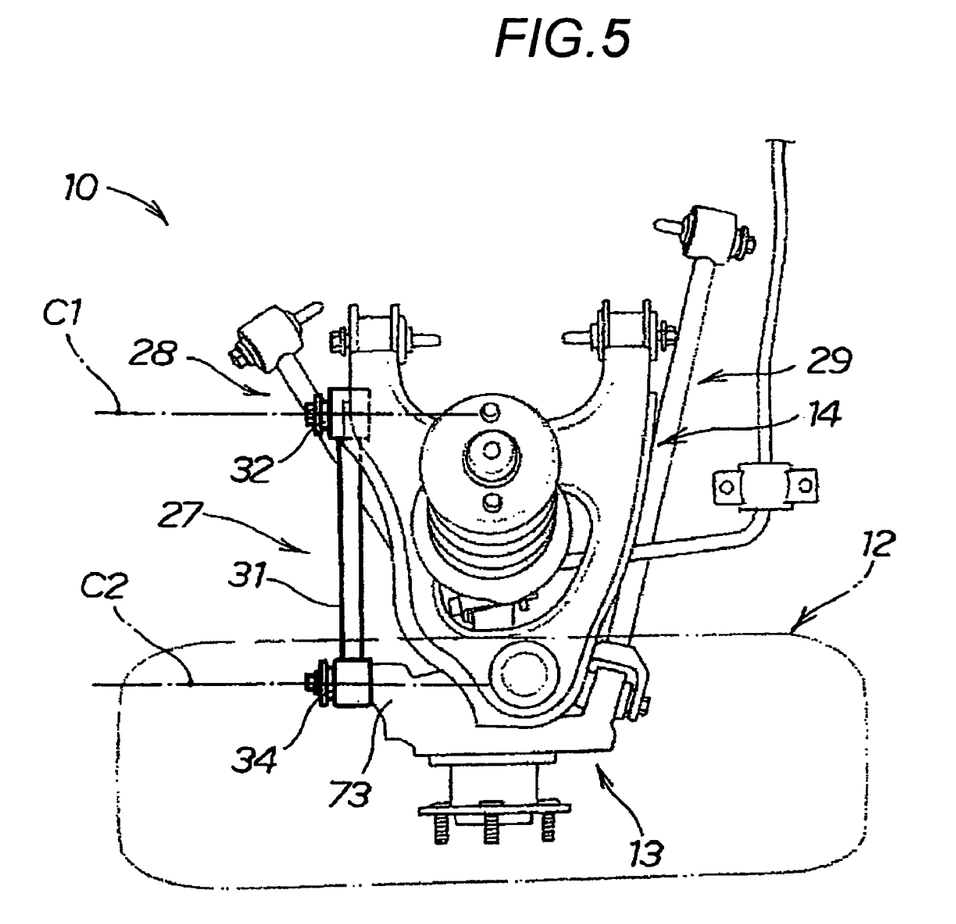
FIG. 5 is a plan view of the vehicle suspension apparatus shown in FIG. 1, showing a lower arm included therein.
Figure 6:
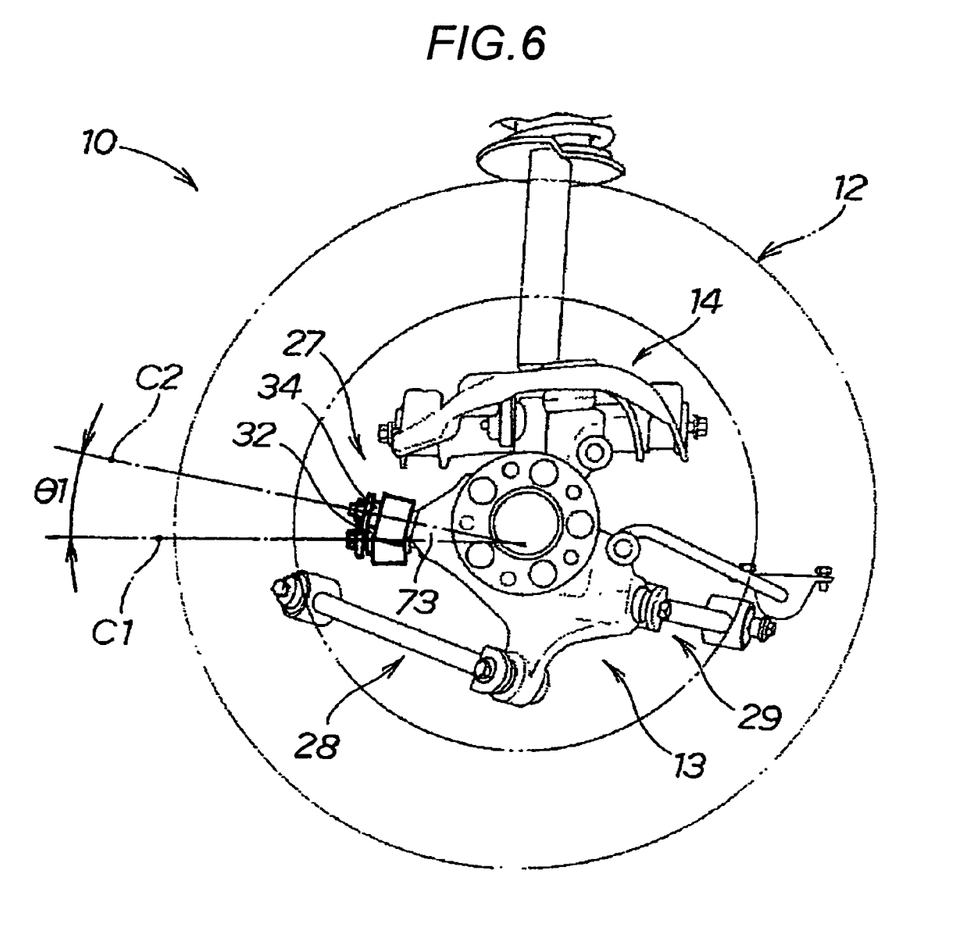
FIG. 6 is a side view of the vehicle suspension apparatus shown in FIG. 1, showing the lower arm included therein.

FIG. 5 is a plan view of the lower arm of the vehicle suspension apparatus shown in FIG. 1, showing the characteristic of the lower arm. FIG. 6 is a side view of the lower arm of the vehicle suspension apparatus shown in FIG. 1, showing the characteristic of the lower arm.

As shown in FIG. 5, the arm (the first lower arm) is disposed such that the center line C1 of the first rubber bush (the rubber bush joint disposed on the vehicle body side) and the center line C2 of the second rubber bush (the rubber bush joint on the knuckle side) are substantially parallel to each other when the arm is viewed from above.

As shown in FIG. 6, the arm is disposed such that the center line C1 of the first rubber bush and the center line C2 of the second rubber bush have a predetermined angle of inclination θ1 between them when the arm is viewed from laterally.

In the vehicle suspension apparatus 10, from the vehicle body side, there are extended a plurality of arms 14, 27 to 29, while the knuckle 13 is supported such that it may be swung. Of the plurality of arms 14, 27 to 29, the first lower arm (arm) 27 includes a straight arm portion (rod) 31, a first rubber bush 32 provided on one end of the arm portion 31, and a second rubber bush 34 provided on the other end of the arm portion 31; and, the center lines C1 and C2 of the first and second rubber bushes 32 and 34, when they are viewed from the axial direction of the arm portion 31, have a predetermined angle of inclination between them.

Use of this structure makes it possible to set the center lines C1 and C2 of the first and second rubber bushes 32 and 34 in the optimum direction, thereby being able to reduce the deformation amounts (hysteresis) of the first and second rubber bushes 32 and 34. As a result of this, the outside diameters of the first and second rubber bushes 32 and 34 may be reduced and thus the weight of the vehicle suspension apparatus 10 may be reduced.

Generally, in a suspension apparatus such as a multi-link type of suspension apparatus which uses a large number of arms, when the rubber bushes of the arms is deflected greatly, there occurs an unexpected vibration absorbing mechanism, which may worsen the driving feeling of the vehicle.

That is, the center lines C1 and C2 of the first and second rubber bushes 32 and 34 are set to have a predetermined angle of inclination between them, the center lines C1 and C2 of the first and second rubber bushes 32 and 34 are set in the optimum direction, and the deformation amounts (hysteresis) of the first and second rubber bushes 32 and 34 are reduced, whereby the vehicle driving feeling may be improved.

In the first lower arm (arm) 27, an inclination angle between the center lines C1 and C2 is set in the range of 5 to 20 degrees, which may improve the vehicle driving feeling further. Here, when the inclination angle is less than 5 degrees, the deformation amounts (hysteresis) of the first and second rubber bushes 32 and 34 may not be reduced sufficiently. Also, when the inclination angle exceeds 20 degrees, the deformation amounts of the first and second rubber bushes 32 and 34 increase, so that the hysteresis thereof is increased. This is unfavorable from the viewpoint of the vehicle driving feeling.

The arm, which is disposed on the front side of the knuckle, has a function to mainly restrict the movement of the knuckle in the toe direction. In order to provide a preferable toe angle variation characteristic, it is necessary to reduce the length of the arm with respect to the knuckle disposed on the rear side of the knuckle. In this case, the arm disposed on the front side of the knuckle is short in the arm length and thus the deforming amount of the bush is easy to increase. In view of this, the first lower arm (arm) 27 with a given inclination angle set between the respective center lines of first and second rubber bushes 32 and 34 is connected to the front side of the knuckle 13. This may prevent the deformation of the bush effectively.

According to the vehicle suspension apparatus of the invention, as shown in FIGS. 5 and 6, the center lines C1 and C2 of the first and second rubber bushes 32 and 34 of the first lower arm (arm) 27 are set to have a predetermined angle of inclination between them. However, this is not limitative but there may also be employed a structure in which the center lines of the rubber bushes of another arm are set to have a given inclination angle.

The vehicle suspension apparatus according to the invention may be suitably used in a passenger car such as a sedan and a station wagon.

What is claimed is:

1. A vehicle suspension apparatus, comprising:
    a plurality of arms respectively extending from a vehicle body, and
    a knuckle swingably supported on ends of the arms and to which a wheel is attached, the plurality of arms comprising:
        an upper arm extending from the vehicle body in a vehicle width direction and coupled to an upper part of the knuckle, and
        three lower arms respectively extending from the vehicle body in the vehicle width direction and coupled to a lower part of the knuckle;
    wherein one of the lower arms comprises:
        a straight arm portion;
        a first rubber bush disposed on one end of the arm portion; and
        a second rubber bush disposed on the other end of the arm portion; and
    wherein the first rubber bush and the second rubber bush are disposed on the arm portion to have an inclination angle between a center line of the first rubber bush and a center line of the second rubber bush, viewed from an axial direction of the arm portion.

2. The vehicle suspension apparatus according to claim 1, wherein the inclination angle is within a range of 5 to 20 degrees.

3. The vehicle suspension apparatus according to claim 1, wherein the one of the arms is coupled to a front side of the knuckle.

4. The vehicle suspension apparatus according to claim 1, wherein the lower arms comprise:
    a first lower arm extending from the vehicle body in the vehicle width direction and coupled to a portion on a front edge of the knuckle corresponding to a height position of a wheel axle, wherein the first lower arm is the one of the plurality of the arms;
    a second lower arm extending from the vehicle body in the vehicle width direction and coupled to a portion on a vicinity of a center of the knuckle corresponding to a lower position of the wheel axle; and
    a third lower arm extending from the vehicle body in the vehicle width direction and coupled to a portion on a rear edge of the knuckle corresponding to the lower position of the wheel axle.

5. The vehicle suspension apparatus according to claim 4, wherein the third lower arm is shorter than the first lower arm.

* * * * *